(No Model.)
R. A. MORGAN.
LID FOR FRYING PANS, &c.
No. 573,680. Patented Dec. 22, 1896.
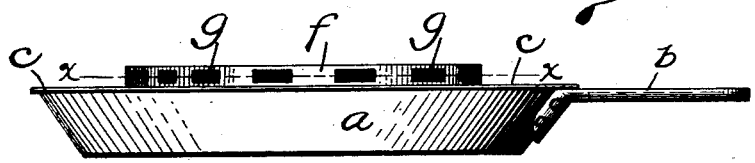
Fig. 1.
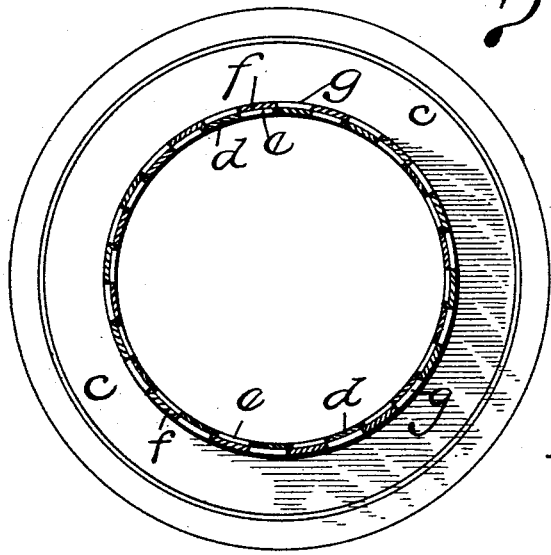
Fig. 2.
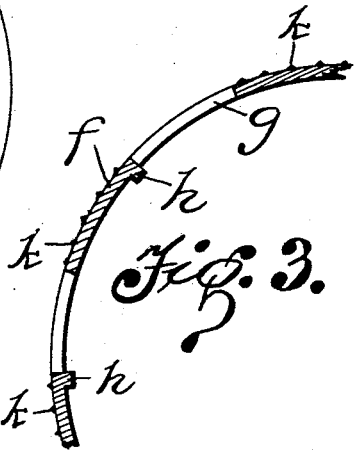
Fig. 3.
Fig. 4.
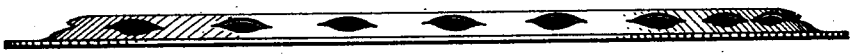
Witnesses:
A. R. Appleman Jr.
A. M. Muiran
Inventor:
Rachel A. Morgan.
By Henry C. Evert, Att'y.
THE NORRIS PETERS CO., PHOTO-LITHO., WASHINGTON, D. C.

UNITED STATES PATENT OFFICE.

RACHEL ANTHONY MORGAN, OF BRADDOCK, PENNSYLVANIA.

LID FOR FRYING-PANS, &c.

SPECIFICATION forming part of Letters Patent No. 573,680, dated December 22, 1896.

Application filed September 18, 1896. Serial No. 606,236. (No model.)

*To all whom it may concern:*

Be it known that I, RACHEL ANTHONY MORGAN, a citizen of the United States of America, residing at Braddock, in the county of Allegheny and State of Pennsylvania, have invented certain new and useful Improvements in Lids for Frying-Pans and the Like, of which the following is a specification, reference being had therein to the accompanying drawings.

This invention relates to certain new and useful improvements in lids for frying-pans and the like, and has for its object to construct a lid that will confine the grease within the pan and at the same time permit the steam to escape, if so desired.

The invention further aims to construct a lid of the above class that will be extremely simple in its construction, strong, durable, effectual in its operation, and comparatively inexpensive to manufacture; furthermore, a lid provided with a series of apertures which can be closed or opened at will, so as to obtain a suitable cover for the pan, according to the nature of the materials contained therein.

With the above and other objects in view the invention finally consists in the novel construction, combination, and arrangement of parts to be hereinafter more specifically described, and particularly pointed out in the claims.

In describing the invention in detail reference is had to the accompanying drawings, forming a part of this specification, and wherein like letters of reference indicate similar parts throughout the several views, in which—

Figure 1 is a side elevation of a frying-pan with my improved lid in position. Fig. 2 is a sectional view taken on the line X X of Fig. 1. Fig. 3 is a sectional view of a portion of the band. Fig. 4 is a side elevation of a modified form of lid.

In the drawings, $a$ represents the pan, and $b$ the handle thereof, which have been shown in the drawings in order to illustrate the application of my invention. The lid $c$ is shown flat in the drawings, though the same may be raised, if so desired, and is provided on top with a cupola $d$, having around the sides thereof a series of slots or perforations $e$. A band $f$ is adapted to fit around this cupola and is provided with slots $g\ g$, conforming to the slots $e\ e$ in the sides of the cupola, said band being adapted to slide on said cupola and carries projections $h\ h$, engaging in the slots $e\ e$ to limit the movement of the band around the cupola and also to prevent the same becoming disengaged therefrom.

The operation of my improved lid will be readily apparent from the views of the same shown and from the foregoing description, and a further detailed description of the same is deemed unnecessary to illustrate the same. I wish, however, to particularly point out the advantages gained through its use, as when the band is closed over the apertures in the cupola all steam will be confined within the pan and materially assist in the cooking of certain foods, while where it is desired to allow the steam to escape and still confine the grease within the pan the band is turned so as to bring the slots in the band in communication with the slots in the cupola, as will be readily understood. It will also facilitate the cooking of certain foods by reason of the heat being confined within the pan.

The band $f$ is corrugated at the solid portions, as shown at $k\ k$, so as to assist in the turning of same to open or close the apertures.

Fig. 4 I have shown as a modification which may be employed, if desired.

It will be noted that various changes may be made in the details of construction without departing from the general spirit of my invention.

Having fully described my invention, what I claim as new, and desire to secure by Letters Patent, is—

1. In a lid for frying-pans and the like having a cupola on its upper face, said cupola being perforated and having a perforated band around said cupola, substantially as shown and described.

2. A lid consisting of the cover, a cupola on said cover said cupola having a series of perforations around the sides a perforated band around said cupola, said band carrying projections engaging in the perforations in the sides of the cupola, substantially as shown and described.

In testimony whereof I affix my signature in presence of two witnesses.

RACHEL ANTHONY MORGAN.

Witnesses:
  A. M. WILSON,
  ARNOLD W. MUELLER.